US011197314B2

(12) United States Patent
Akoum et al.

(10) Patent No.: US 11,197,314 B2
(45) Date of Patent: *Dec. 7, 2021

(54) CONFIGURABLE GROUPS OF CONTROL CHANNEL RESOURCE SETS FOR WIRELESS COMMUNICATION

(71) Applicant: AT&T Intellectual Property I, L.P., Atlanta, GA (US)

(72) Inventors: Salam Akoum, Austin, TX (US); Ralf Bendlin, Cedar Park, TX (US); Xiaoyi Wang, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,783

(22) Filed: Jan. 29, 2020

(65) Prior Publication Data

US 2020/0170036 A1 May 28, 2020

Related U.S. Application Data

(63) Continuation of application No. 15/674,118, filed on Aug. 10, 2017, now Pat. No. 10,588,148.

(51) Int. Cl.
*H04W 72/04* (2009.01)
*H04W 74/00* (2009.01)
(Continued)

(52) U.S. Cl.
CPC ......... *H04W 74/006* (2013.01); *H04L 5/0044* (2013.01); *H04W 72/046* (2013.01);
(Continued)

(58) Field of Classification Search
CPC ............. H04W 74/006; H04W 74/008; H04W 74/002; H04W 72/0466; H04W 72/085;
(Continued)

(56) References Cited

U.S. PATENT DOCUMENTS 6,519,462 B1 * 2/2003 Lu ........................ H04W 72/02
455/453
8,588,246 B2 11/2013 Li et al.
(Continued)

OTHER PUBLICATIONS

International Preliminary Report on Patentability received for PCT Application Serial No. PCT/US2018/045487 dated Feb. 20, 2020, 13 pages.
(Continued)

*Primary Examiner* — Phong La
(74) *Attorney, Agent, or Firm* — Amin, Turocy & Watson, LLP

(57) ABSTRACT

The described technology is generally directed towards wireless communications systems in which multiple control channel resource sets (CORESETs) are configured into a CORESET group. The CORESET group may be associated with a usage scenario/quality of service requirement, and used by user equipment to decode downlink control information corresponding to that usage scenario. For example, one CORESET group can be used for URLLC traffic, another for eMBB type traffic and another for mMTC traffic. Different CORESET groups may be used to provide different aggregation level sets, different DMRS pattern configurations, different search spaces, different transmission protocols/schemes, different beam management and recovery procedures, different radio link monitoring and radio link failure procedures, and so on. Different CORESET groups may be associated with different transmission points.

20 Claims, 10 Drawing Sheets

(51) Int. Cl.
  *H04L 5/00*     (2006.01)
  *H04W 72/08*    (2009.01)
  *H04W 4/70*     (2018.01)
  *H04B 7/0413*   (2017.01)

(52) U.S. Cl.
  CPC ......... *H04W 72/085* (2013.01); *H04B 7/0413* (2013.01); *H04L 5/0005* (2013.01); *H04L 5/0037* (2013.01); *H04L 5/0064* (2013.01); *H04L 5/0076* (2013.01); *H04W 4/70* (2018.02)

(58) Field of Classification Search
  CPC ...... H04W 4/70; H04L 5/0044; H04L 5/0042; H04L 5/0037; H04L 5/0032; H04L 5/003; H04L 5/0046; H04L 5/0005; H04L 5/0064; H04L 5/00476; H04B 7/0413
  USPC ......................................................... 370/329
  See application file for complete search history.

(56) References Cited

U.S. PATENT DOCUMENTS

| | | | |
|---|---|---|---|
| 9,055,578 B2 | 6/2015 | Sartori et al. | |
| 9,220,090 B2 | 12/2015 | Horiuchi et al. | |
| 9,270,440 B2 | 2/2016 | Chen et al. | |
| 9,380,568 B2 | 6/2016 | Harrison et al. | |
| 9,386,566 B2 | 7/2016 | Turtinen et al. | |
| 9,474,053 B2 | 10/2016 | Kulal et al. | |
| 2008/0225791 A1* | 9/2008 | Pi | H04B 7/0639 370/330 |
| 2008/0232449 A1* | 9/2008 | Khan | H04L 25/03343 375/220 |
| 2011/0065446 A1* | 3/2011 | Mueck | H04W 72/082 455/452.2 |
| 2011/0086614 A1* | 4/2011 | Brisebois | H04W 12/08 455/411 |
| 2012/0207025 A1* | 8/2012 | Barbieri | H04L 1/20 370/236 |
| 2013/0242882 A1* | 9/2013 | Blankenship | H04L 5/0041 370/329 |
| 2013/0259056 A1 | 10/2013 | Kotrabasappa et al. | |
| 2014/0043988 A1 | 2/2014 | Chen et al. | |
| 2014/0233537 A1 | 8/2014 | Wu et al. | |
| 2015/0109969 A1* | 4/2015 | Celebi | H04L 5/0073 370/278 |
| 2015/0200741 A1 | 7/2015 | Liu et al. | |
| 2015/0236826 A1 | 8/2015 | Liu et al. | |
| 2015/0237459 A1 | 8/2015 | Webb et al. | |
| 2016/0014762 A1 | 1/2016 | Ji et al. | |
| 2016/0128028 A1* | 5/2016 | Mallik | H04L 5/0053 370/336 |
| 2016/0270038 A1* | 9/2016 | Papasakellariou | H04L 5/005 |
| 2017/0150538 A1 | 5/2017 | Wei | |
| 2017/0332359 A1* | 11/2017 | Tsai | H04B 7/0639 |
| 2017/0353947 A1* | 12/2017 | Ang | H04L 5/0048 |
| 2018/0049193 A1* | 2/2018 | Belleschi | H04W 72/0446 |
| 2018/0077718 A1* | 3/2018 | Nory | H04L 1/1854 |
| 2018/0192428 A1* | 7/2018 | Doostnejad | H04B 7/0452 |
| 2018/0242282 A1* | 8/2018 | Li | H04W 72/02 |
| 2018/0249456 A1* | 8/2018 | Liu | H04W 72/0413 |
| 2018/0310333 A1* | 10/2018 | Akkarakaran | H04W 72/1278 |

OTHER PUBLICATIONS

International Search Report and Written Opinion for International Application Serial No. PCT/US2018/045487 dated Feb. 26, 2019, 14 pages.
CMCC, "Discussion on NR-PDCCH search space design," 3GPP Draft; R1-1710780, 3rd Generation Partnershi P Project (3GPP), Mobile Compeience Centre ., 650, Route Des L. Ucioles ., F-06921 Sophia-Anti Poll S Cedex , France , vol. RAN WGI, No. Qingdao, P.R. China; Jun. 27, 2017-Jun. 30, 2017 Jun. 26, 2017 (Jun. 26, 2017), XP051299984, Retrieved from the Internet: URL:http://www.3gpp.org/ftp/Meetings_3GPP_SYNC/RANI/Docs/ [retrieved on Jun. 26, 2017].
Panasonic: "Configuration of Coreset and Search space design", 3GPP Draft; R1-1708109, 3rd Generation Partnership Project (3GPP), Mobile Competence Centre ; 650, Route Des Lucioles ; F-06921 Sophia-Antipolis Cedex; France, vol. RAN WGI, No. Hangzhou; May 15, 2017-May 19, 2017 May 14, 2017 (May 14, 2017), XP051273305, Retrieved from the Internet: URL:http://www.3gpp.org/ftp/Meetings 3GPP SYNC/RANI/Docs/ [retrieved on May 14, 2017].
Non-Final Office Action dated Nov. 19, 2018 for U.S. Appl. No. 15/674,118, 37 pages.
Final Office Action dated May 6, 2019 for U.S. Appl. No. 15/674,118, 32 pages.
Communication pursuant to Article 94(3) EPC received for European Patent Application Serial No. 18762200.6 dated Jul. 20, 2021, 6 Pages.
Notification of Reason for Refusal received for korean patent Application serial No. 10-2020-7006072 dated Mar. 29, 2021, 12 pages.
Catt, "NR frame structure for multiplexing of URLLC and eMBB traffic in DL", 3GPP TSG RAN WG1 Meeting #88, R1-1702103, Feb. 13-17, 2017, 04 pages.
Examination Report received for Indian Application Serial No. 202047005690 dated Mar. 22, 2021, 06 Pages.
Notice of Reasons for Refusal received Japanese patent Application serial No. 2020-507564 dated Apr. 22, 2021, 08 pages.
MediaTek Inc., "Discussions on Coreset configurations", 3GPP TSG RAN WG1 Meeting NR AH#2, R1-1710790, Jun. 27-30, 2017, 05 pages.
Intel Corporation, "PDCCH transmission schemes and multi-beam operation", PDCCH transmission schemes and multi-beam operation, R1-1707378, May 15-19, 03 pages.
Nokia, Alcatel-Lucent Shanghai Bell, "On the PDCCH control resource set and its connection to the search space for NR", 3GPP TSG RAN WG1 NR Ad-Hoc#2, R1-1710980, Jun. 27-30, 2017, 5 pages.

* cited by examiner

CONFIGURABLE GROUPS OF CONTROL CHANNEL RESOURCE SETS FOR WIRELESS COMMUNICATION

CROSS-REFERENCE TO RELATED APPLICATION

The subject patent application is a continuation of, and claims priority to, U.S. patent application Ser. No. 15/674,118 (now U.S. Pat. No. 10,588,148), filed Aug. 10, 2017, and entitled "CONFIGURABLE GROUPS OF CONTROL CHANNEL RESOURCE SETS FOR WIRELESS COMMUNICATION," the entirety of which application is hereby incorporated by reference herein.

TECHNICAL FIELD

The subject application is generally related to wireless communication, and, for example, to configurable groups of control channel resource sets for wireless communication.

BACKGROUND

In wireless communication systems, a control channel resource set (CORESET) is defined as a set of resource element groups (REGs) within which a user equipment attempts to decode downlink control information. Current standards, as well as standards being developed for fifth generation (5G) access networks, which can also be referred to as New Radio (NR) access networks, define control channel resource sets. A user equipment can have one or more control channel resource sets.

Each control channel resource set is associated with a search space that indicates the set of Control Channel Element (CCE) locations where the user equipment may find the Physical Downlink Control Channels (PDCCHs). The search space includes one or more aggregation levels, defined as the number of control channel elements aggregated for transmission for each PDCCH, and the number of decoding candidates for each aggregation level. The time/frequency resource containing at least one search space is obtained from the management information base (MIB), system information, or is implicitly derived from initial access information. Time/frequency resource containing additional search spaces can be configured using dedicated Radio Resource Control (RRC) signaling.

A search space in NR networks is associated with a single control channel resource set. The search spaces in different control resource sets are defined independently.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
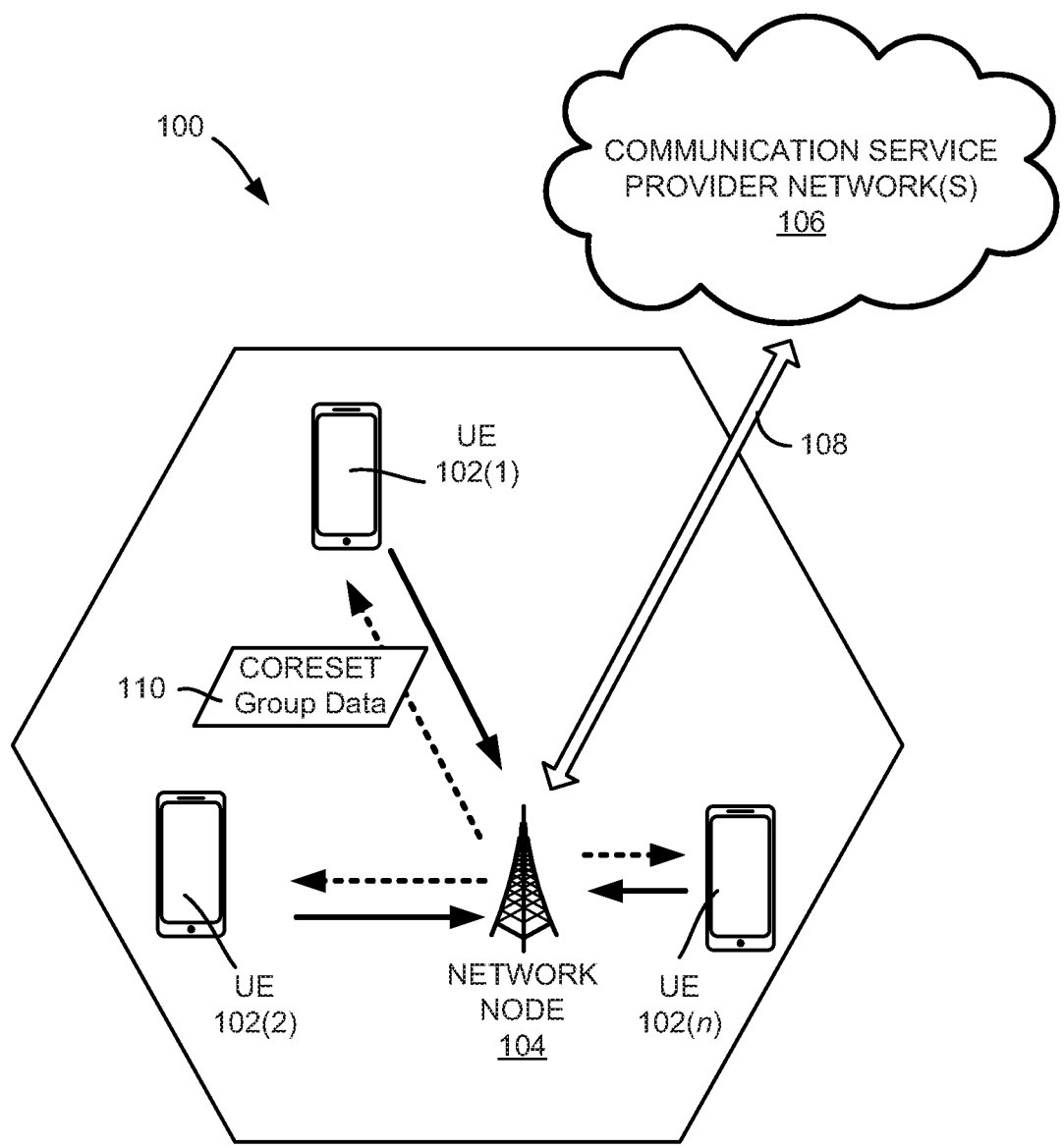
FIG. 1 illustrates an example wireless communication system in which a network node device (e.g., network node) and user equipment (UE) can implement various aspects and implementations of the subject disclosure.

Briefly, one or more aspects of the technology described herein are generally directed towards the concept of groups of control channel resource sets (CORESETs), each of which can be associated with a usage scenario. For example, a group of control channel resource sets can be associated per transmission point (TRP), or per quality of service requirements.

By way of example, consider that different types of network data traffic have different quality of service requirements. More particularly, Ultra Reliable and Low Latency Communications (URLLC) traffic has stringent latency (0.5 ms on the user plane for uplink and downlink) and reliability requirements that need to be satisfied, whereas enhanced Mobile Broadband (eMBB) traffic has relatively relaxed latency and reliability requirements. Note that another usage scenario with different requirements is massive Machine Type Communications (mMTC).

Thus, each of the families of usage scenarios has different deployment scenarios including carrier frequency, aggregated system bandwidth, user equipment distribution, service profile, etc. In one or more aspects as described herein, these differences in quality of service requirements for different usage scenarios translate into different control resource sets groups definitions, such that each group of control channel resource sets corresponds to a different type of traffic. As will be understood, aspects described herein relate to the configuration of control channel resources as a function of usage scenario. To this end, the technology described herein provides for a control channel resource set definition such that the definition supports configurable CORESETs characteristics depending on the type of traffic.

A CORESET group may be defined as multiple control channel resource sets, that can be associated per transmission point (TRP), or per quality of service requirements; that is, a CORESET group comprises a group of control channel resource sets configured to decode downlink control information corresponding to a particular usage scenario. Such a grouping of CORESETs works with various applications of NR, to cater to different traffic needs and differentiate between control plane and user plane procedures corresponding to different quality of service levels. A configurable grouping of CORESETs thus may be defined based on the quality of service requirements of the traffic served by the corresponding downlink control information. As in the above example, a CORESET group can correspond to URLLC traffic, where the latency and reliability requirements are stringent, or can correspond to eMBB type traffic, where the latency and reliability requirements are more relaxed, but higher data rates are needed.

In one aspect, a different search space per CORESET group may be defined, such that the time/frequency resources containing search spaces for control channel resource sets per CORESET group are configured differently according to the quality of service requirements of the usage scenario corresponding to each CORESET group.

In another aspect, different demodulation reference signals (DMRS) configuration patterns sets may be used depending on the CORESET group. For example, there are different DMRS configuration patterns defined for data demodulation in NR. At least one of these configurations supports a front-loaded DMRS pattern, in which front-loaded DMRS is mapped over one or two adjacent OFDM symbols. Additional DMRS patterns can be configured for the latter part of the slot. As a more particular example, assuming that there is a set of four (4) possible DMRS patterns configurations, each CORESET group can be configured with a subset of configurations out of this set. One DMRS configuration can be defined for CORESET group 1, while three candidate configurations can be defined for CORESET group 2 to choose from. This depends on the number of ports, the number of layers for the MIMO scheme, and the desired performance per usage scenario.

In another aspect of CORESET grouping, the CORESETs can be grouped in such a way that a CORESET group is formed per transmission point (TRP), and each of the transmission point may cater to one or more usage scenario corresponding to one or more quality of service requirements.

In general, the network device communicates downlink control information to the user equipment in one or more control channel resource sets grouped into CORESET groups. The network may or may not communicate the group information explicitly to the user equipment. In one or more implementations, the user equipment then uses the CORESET group to decode downlink control information corresponding to a particular usage scenario, such as to satisfy a quality of service requirement, as described herein.

For simplicity, the non-limiting terms "network device," "radio network node" or "network node" may be used herein for any type of network node that serves user equipment and/or is connected to other network node(s) or network element(s), or any radio node from where user equipment receives signals. Non-limiting examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), and so on.

Similarly for reception the non-limiting term "user equipment" (or "UE") is used herein. This term refers to any type of wireless device that communicates with a radio network node in a cellular or mobile communication system. Non-limiting examples of UE comprise a target device, device to device (D2D) UE, machine type UE or UE capable of machine-to-machine (M2M) communication, PDA, Tablet, mobile terminals, smart phone, laptop embedded equipped (LEE), laptop mounted equipment (LME), USB dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly, and so on.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network node 104. The network node (e.g., network node device) can communicate with the user equipment (UE), thus providing connectivity between the UE and the wider cellular network.

In example implementations, each UE such as the UE 102(1) is able to send and/or receive communication data via a wireless link to the network node 104. The dashed arrow lines from the network node 104 to the UE 102 represent downlink (DL) communications and the solid arrow lines from the UE 102 to the network nodes 104 represents uplink (UL) communications.

The system 100 can further include one or more communication service provider networks 106 that facilitate providing wireless communication services to various UEs, including UES 102(1)-102(n), via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to an improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, the network node is configured to provide a user equipment (e.g., 102(1)) with CORESET group data 110, for use in decoding control information. As will be understood, the network node recognizes or otherwise evaluates the usage scenario, e.g., the type of data traffic to be communicated, to determine the CORESET group data 110 to send. For example, if the usage scenario corresponds to Ultra Reliable and Low Latency Communications (URLLC) traffic, the CORESET group is chosen with CORESETs that have various resource element groups which are appropriate for URLLC quality of service requirements.

As a more particular example, different aggregation level sets may correspond to different CORESET groups, where an aggregation level is defined as the number of control channel elements (CCEs) aggregated for transmission for each Physical Downlink Control Channel (PDCCH). The higher the aggregation level, the more likely that the user equipment will decode the downlink control channel, as it occupies more CCEs, hence more bits, and uses a more robust coding. Using different CORESET groups with different aggregation levels, for example, channels that carry URLLC control information can be defined with a different (higher) aggregation level set than channels that carry enhanced Mobile Broadband (eMBB) data.

Figure 2:
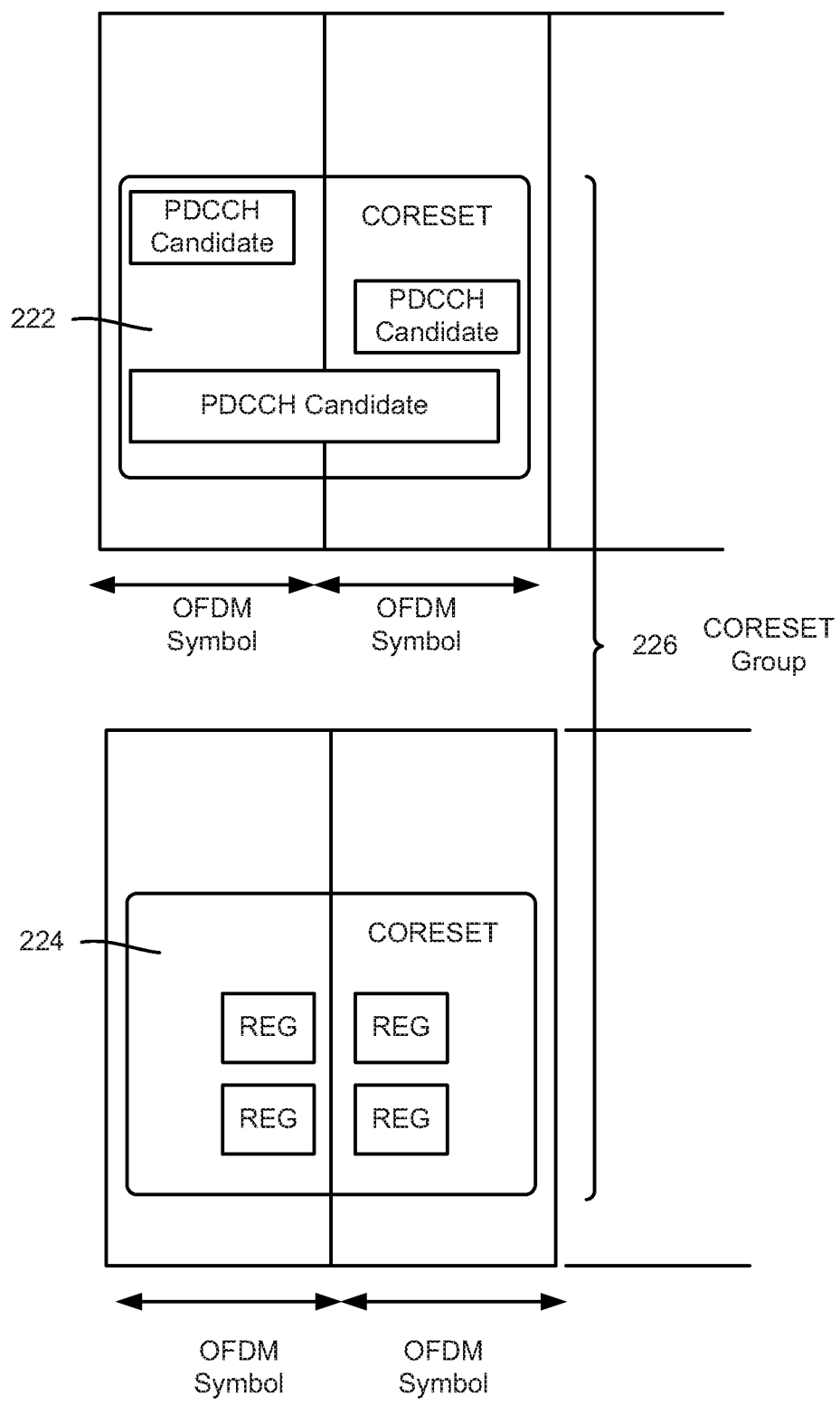
FIG. 2 illustrates an example control channel resource set (CORESET) group, in accordance with various aspects and implementations of the subject disclosure.

As represented in FIG. 2, a CORESET 224 is comprised of resource element groups (REGS), which in turn are made up of resource elements (not individually shown). As represented in the CORESET 222, resource element groups can represent PDCCH candidates, which, for example, can be present in the first OFDM (Orthogonal frequency-division multiplexing) symbol, the second OFDM symbol, or span OFDM symbols. A CORESET group 226 combines the information of two or more CORESETS, e.g., the CORESET 222 and 224 in FIG. 2.

Figure 3:
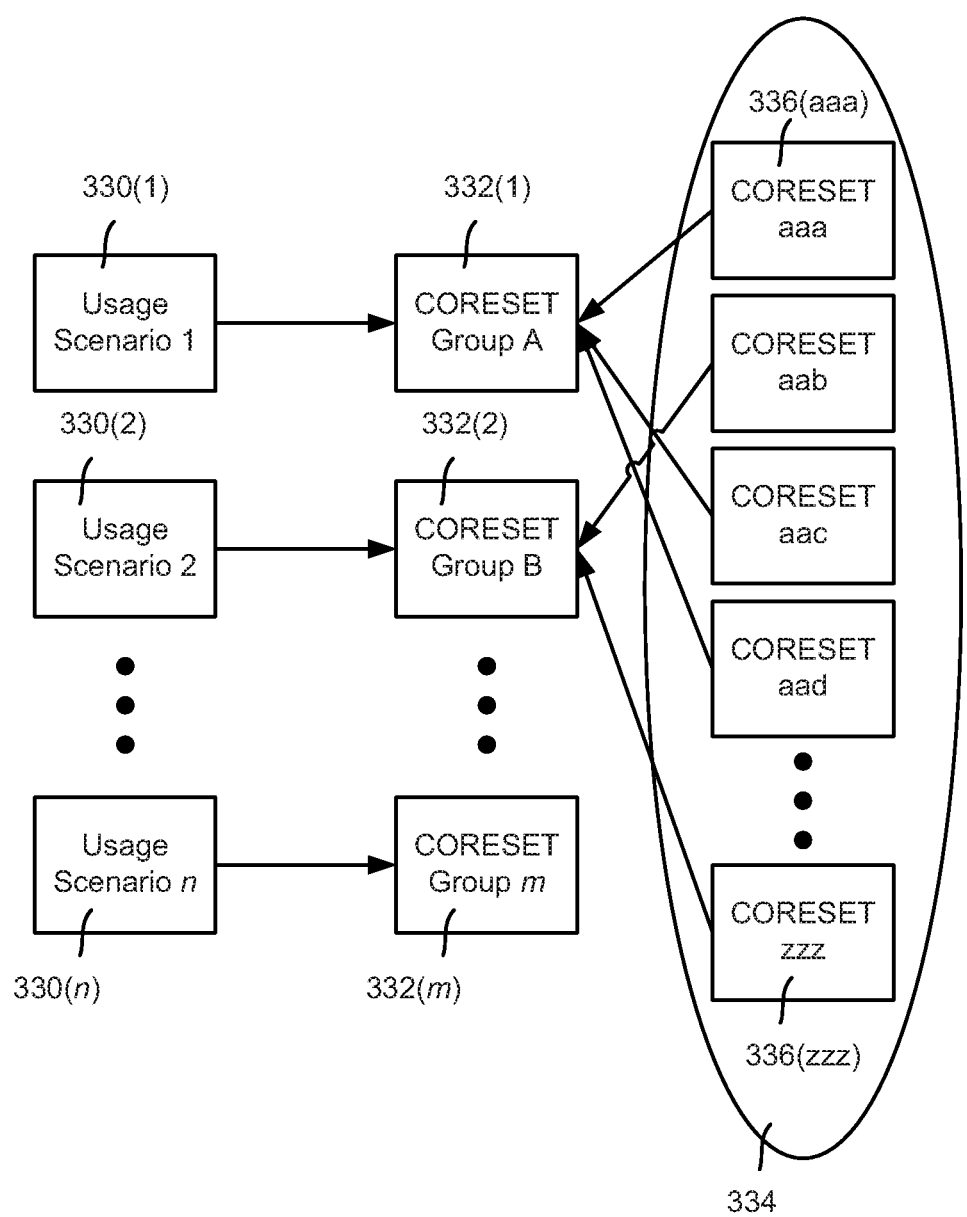
FIG. 3 illustrates an example of associating CORESET groups of CORESETs with usage scenarios, in accordance with various aspects and implementations of the subject disclosure.

In one or more implementations, the network device may send the user equipment the CORESET group to use in decoding the control information. In one alternative implementation, the user can infer the CORESET group information implicitly. In another alternative implementation, the user equipment can blindly decode the downlink control information corresponding to a CORESET within a CORESET group. In one alternative implementation, the user equipment may have a number of CORESETs sent thereto, along with an indication (e.g., set of identifiers) of which of the CORESETs to use as a group. FIG. 3 shows how different usage scenarios 330(1)-330(n) may be mapped to different CORESET groups 332(A)-332(m). The CORESET groups are configured from an available set 334 of individual CORESETS 336(aaa)-336(zzz) as shown (although it is understood that any practical number of CORESETs may be present in a given implementation).

Figure 4:
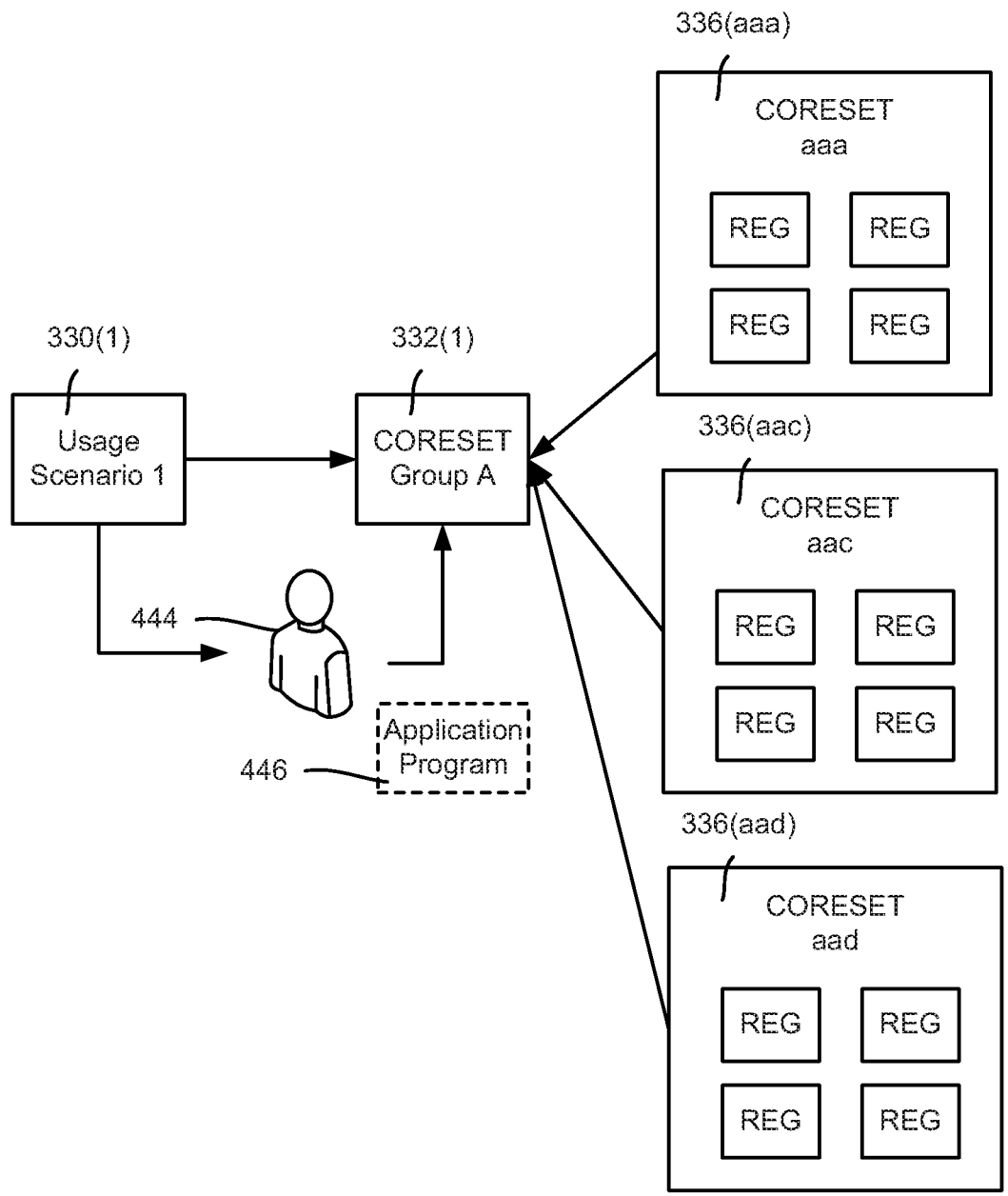
FIG. 4 illustrates an example of configuring a CORESET group for a usage scenario, in accordance with various aspects and implementations of the subject disclosure.

As represented in in FIG. 4, the configuration of a configurable CORESET group (e.g., 332(1)) may be manually performed (e.g., the CORESETs configured and/or selected) by a user 444 performed to meet the needs of a given usage scenario 330(1)), e.g., to satisfy quality of service requirements. Instead of or in addition to manual configuration, an application program 446 or the like may be used, e.g., input the quality of service requirements as parameters (e.g., latency, reliability, data rate, etc.) into the program which outputs CORESETs/a CORESET grouping that satisfies the quality of service requirements.

Figure 5:
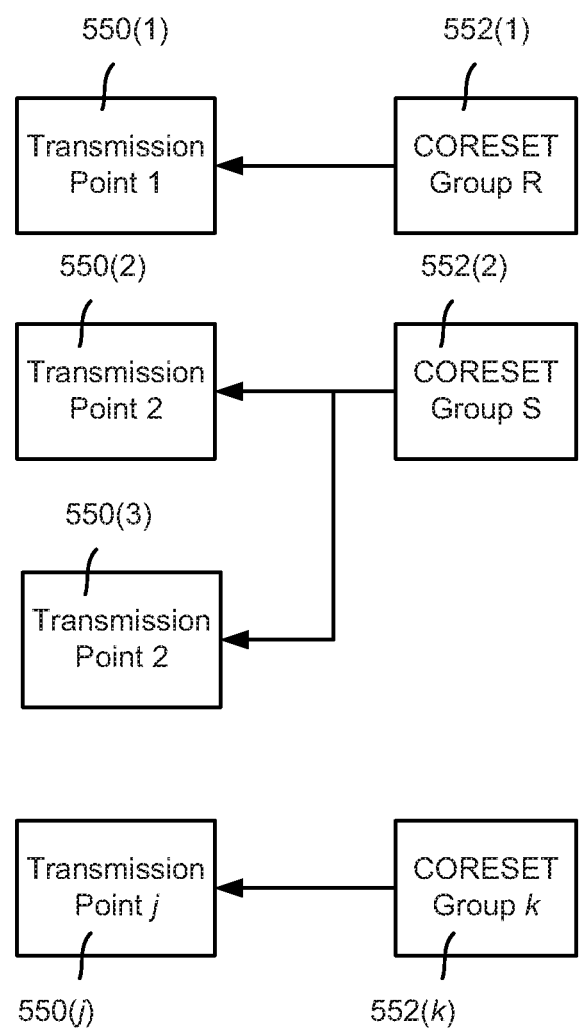
FIG. 5 illustrates an example of associating CORESET groups with transmission points, in accordance with various aspects and implementations of the subject disclosure.

As generally represented in the example of FIG. 5, different transmission points may be associated with different CORESET groups. For example, one transmission point 550(1) may be dedicated to communicating URLLC data, and thus be associated with CORESET group 552(1), while other transmission points 550(2) and 550(3) may be associated with the same CORESET group 552(2), while yet another transmission point 550(j) may be associated with yet another CORESET group 552(k). As is understood, CORESET groups may be flexibly associated with various resources as appropriate for a given implementation.

Figure 6:
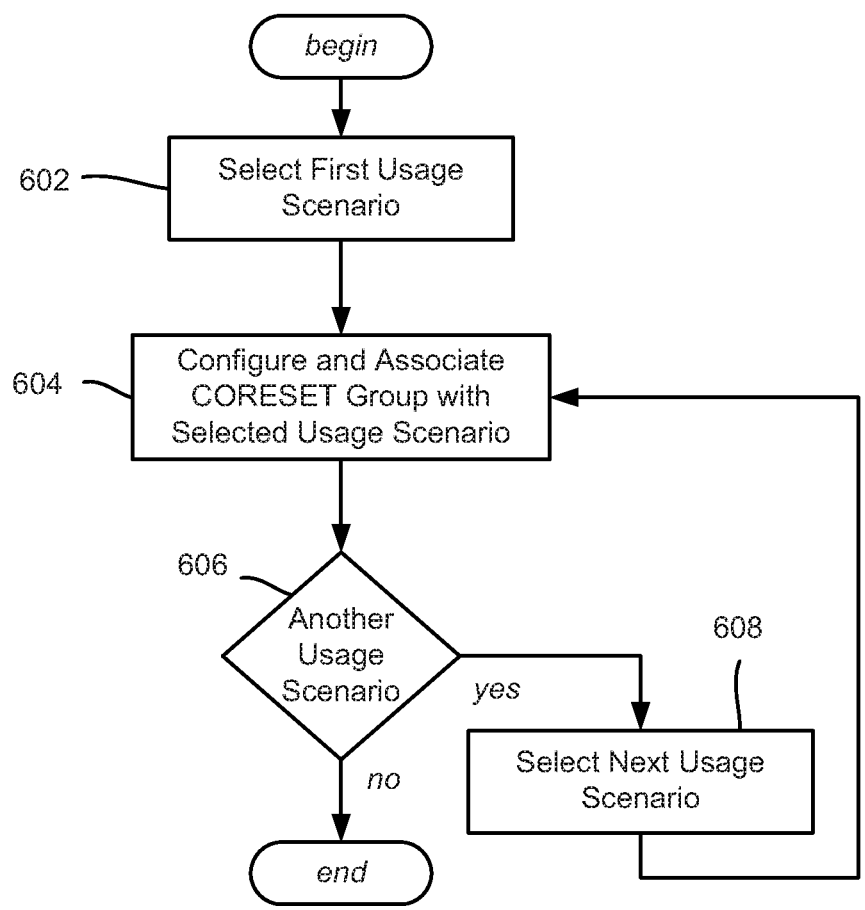
FIG. 6 illustrates an example flow diagram of operations for configuring and associating CORESET groups with usage scenarios, in accordance with various aspects and implementations of the subject disclosure.

As generally represented in the example operations of FIG. 6, exemplified as steps, step 602 represents selecting the usage scenario for which a CORESET group is desired. Based on the usage scenario, step 604 represents a user and/or program configuring and associating a CORESET group with the selected usage scenario. As can be readily appreciated, the CORESET group may be built from existing CORESET(s), from newly configured CORESETs, or a combination of existing CORESET(s) and newly configured CORESET(s).

Steps 606 and 608 repeat the process for each other usage scenario for which a CORESET group is desired. Note that any time a new usage scenario/different characteristics are established, a new CORESET group may be configured and associated with the new usage scenario.

Figure 7:
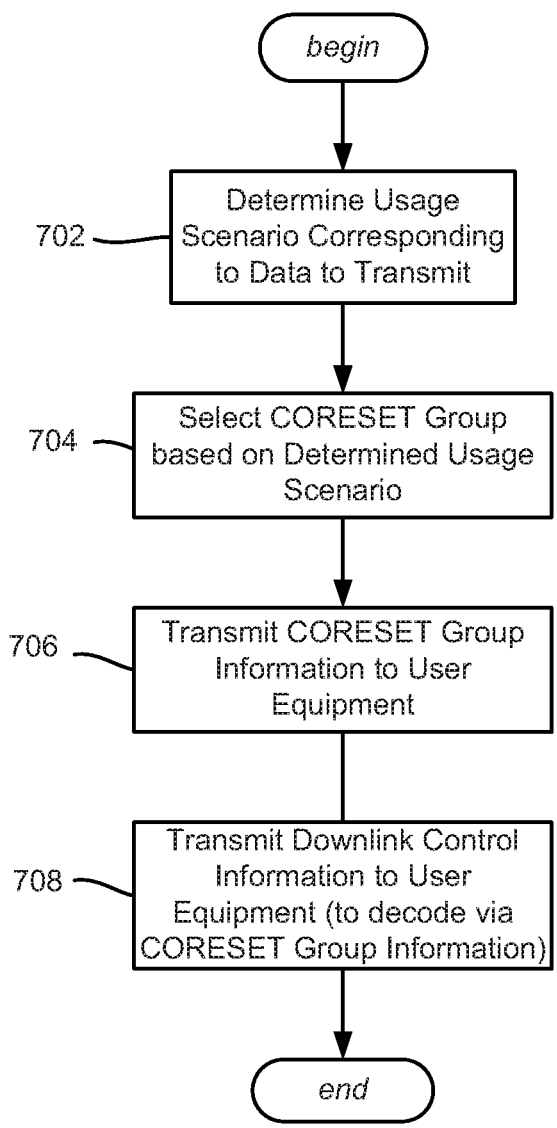
FIG. 7 illustrates an example flow diagram of operations for determining a CORESET group for a user equipment to use, and transmitting corresponding information to the user equipment, in accordance with various aspects and implementations of the subject disclosure.

In the example operations of FIG. 7, a usage scenario is determined at step 702 based on the data to transmit. For example, the network device may recognize from the source of the data to transmit, or the type of data to transmit, the usage scenario corresponding to that data. It is also feasible for the source of the data to indicate (e.g., via an identifier) the usage scenario.

Step 704 represents selecting the CORESET group based on the usage scenario determined at step 702. Step 706 represents transmitting the CORESET group information to the user equipment. Step 708 represents transmitting the downlink control information to the user equipment, which the user equipment can decode based on the CORESET group information sent at step 706.

Figure 8:
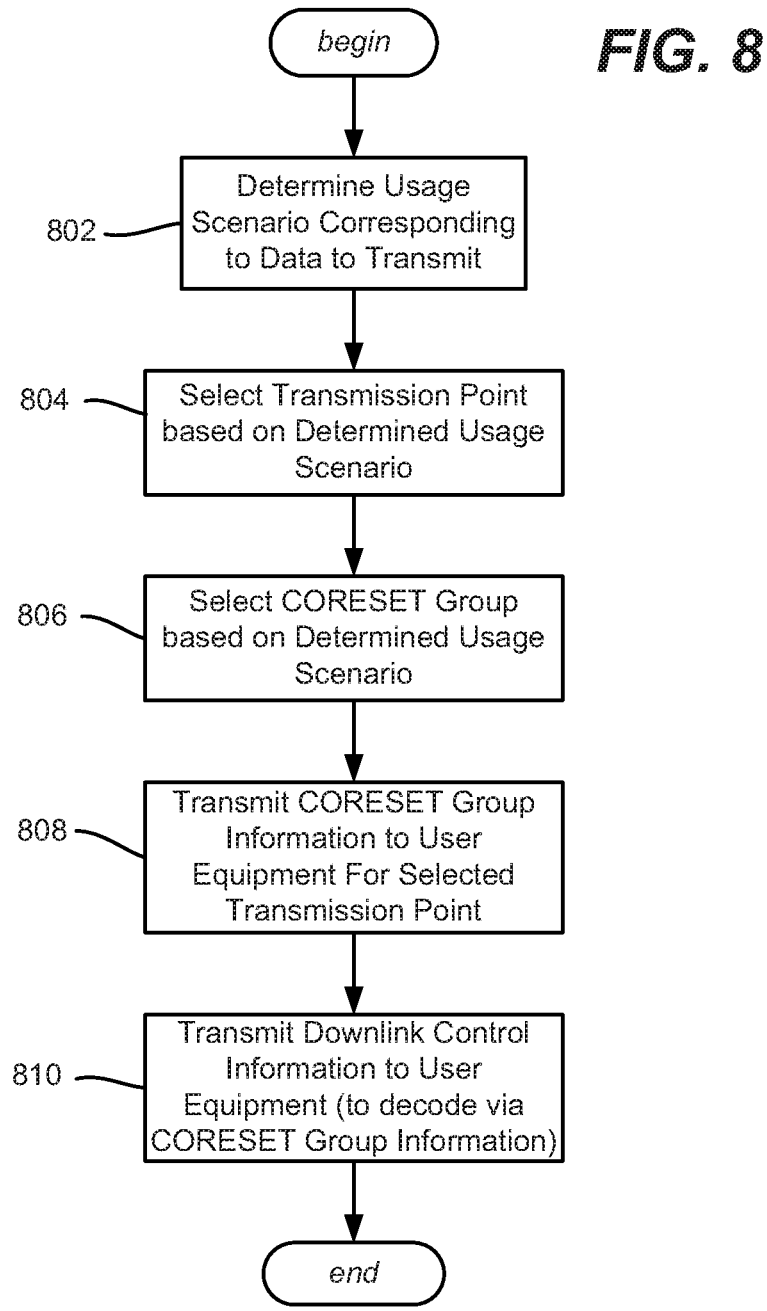
FIG. 8 illustrates an example flow diagram of operations for determining a CORESET group for a transmission point, and transmitting corresponding information to a user equipment, in accordance with various aspects and implementations of the subject disclosure.

As generally represented in the example operations of FIG. 8, exemplified as steps, step 802 represents determining a usage scenario corresponding to data to transmit. Step 804 selects a transmission point for sending data via the usage scenario determined at step 802.

Step 806 selects a CORESET group for the usage scenario. Step 808 represents transmitting the CORESET group information to the user equipment. Step 810 represents transmitting the downlink control information to the user equipment, which the user equipment can decode based on the CORESET group information sent at step 808. The user equipment is thus able to send and receive data appropriately via the transmission point.

As can be seen, the grouping of control channel resource sets based on usage scenario and quality of service requirements allows for significant flexibility in meeting performance requirements for various types of traffic envisioned. The grouping technology allows for several procedures and mechanisms to be implemented in correspondence with various types of usage scenarios, resulting in improved performance when reliability and latency are performance metrics. Procedures and mechanisms that benefit from this grouping include but are not limited to, different MIMO transmission schemes, beam management and recovery procedures, radio resource management, radio link monitoring/ radio link failure procedures. This may be facilitated via the CORESET grouping design based on quality of service requirements of different usage scenarios for next generation wireless networks.

One or more aspects are directed towards associating a first group of control channel resource sets with a first usage scenario, in which the first group of control channel resource sets is configured to decode downlink control information corresponding to the first usage scenario, and associating a second group of control channel resource sets with a second radio usage scenario, in which the second group of control channel resource sets is configured to decode downlink control information corresponding to the second usage scenario. Aspects include transmitting downlink control information to a user equipment in association with information corresponding to the first group of control channel resource sets.

The first usage scenario may correspond to a first type of traffic, and the second usage scenario may correspond to a second type of traffic. The first usage scenario may correspond to a first quality of service requirement, and the second usage scenario may correspond to a second quality of service requirement. The first usage may correspond to first traffic adhering to an enhanced mobile broadband protocol, and wherein the second usage scenario may correspond to second traffic adhering to an ultra-reliable low latency communication protocol. The first usage scenario may correspond to traffic adhering to a massive machine type communications protocol.

Aspects may comprise associating a third group of control channel resource sets with a third radio usage scenario, in which the third group of control channel resource sets is configured to decode downlink control information corresponding to the third usage scenario.

The first group of control channel resource sets may comprise a first aggregation level set that is different from a second aggregation level set of the second group of control channel resource sets.

The first group of control channel resource sets may comprise a first demodulation reference signal pattern configuration that is different from a second demodulation reference signal pattern configuration of the second group of control channel resource sets. The first group of control channel resource sets may correspond to a first transmission point, and the second group of control channel resource sets may correspond to a second transmission point.

The first group of control channel resource sets may correspond to a first search space, and the second group of control channel resource sets may correspond to a second search space. The first group of control channel resource sets may be enabled to use a first multiple input, multiple output transmission protocol that is different from a second multiple input, multiple output transmission protocol of the second group of control channel resource sets.

The first group of control channel resource sets may comprise a first beam management and recovery procedure that is different from a second beam management and recovery procedure of the second group of control channel resource sets. The first group of control channel resource sets may comprise a first transmission scheme that is different from a second transmission scheme of the second group of control channel resource sets. The first group of control channel resource sets may comprise a first radio link monitoring and radio link failure procedure that is different from a second radio link monitoring and radio link failure procedure of the second group of control channel resource sets.

One or more aspects are directed towards configuring, by a system comprising a processor, a first group of control channel resource sets, in which the first group of control channel resource sets is configured to decode first downlink control information corresponding to a first type of data communications traffic. Aspects include configuring, by the system, a second group of control channel resource sets, in which the second group of control channel resource sets is configured to decode second downlink control information corresponding to a second type of data communications traffic. Other aspects include transmitting, by the system, data corresponding to the first group of control channel resource sets to a user equipment, and transmitting, by the system, the first downlink control information to the user equipment for use with the first type of data communications traffic.

Transmitting the data corresponding to the first group of control channel resource sets may comprise transmitting a first group identifier to the user equipment. The configuring the first group of control channel resource sets may comprise determining a quality of service requirement associated with the first type of data communications traffic.

One or more aspects are directed towards determining a first quality of service requirement associated with a first type of data traffic and configuring a first control channel resource set group comprising a first grouping of control channel resource sets, the configuring comprising selecting resource element groups that meet the first quality of service requirement. Aspects comprise determining a second quality of service requirement associated with a second type of data traffic and configuring a second control channel resource set group comprising a second grouping of control channel resource sets, the configuring comprising selecting resource element groups that meet the second quality of service requirement. Other aspects comprise instructing a user equipment to use the first control channel resource set group or the second control channel resource set group based on whether the first type of data traffic or the second type of data traffic is to be communicated to the user equipment.

Aspects may comprise determining a third quality of service requirement associated with a third type of data traffic, and configuring a third control channel resource set group comprising a third grouping of control channel resource sets, the configuring comprising selecting resource element groups that meet the third quality of service requirement. Configuring the first control channel resource set group may be based on satisfaction of enhanced mobile broadband quality of service requirements, the configuring the second control channel resource set group may be based on satisfaction of ultra-reliable low latency communication quality of service requirements, and configuring the third control channel resource set group may be based on satisfaction of massive machine type communications quality of service requirements.

Figure 9:
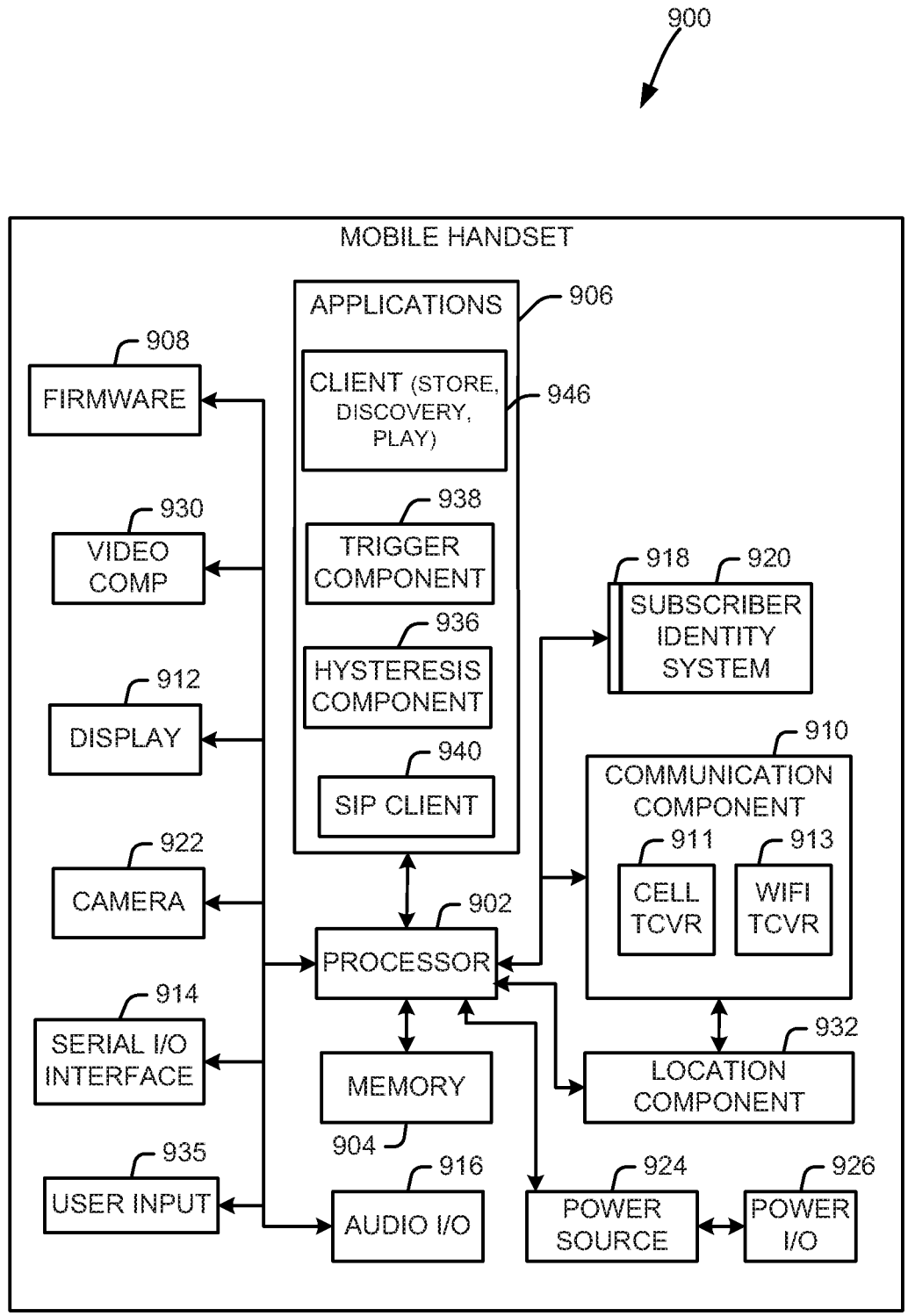
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and trouble-shooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
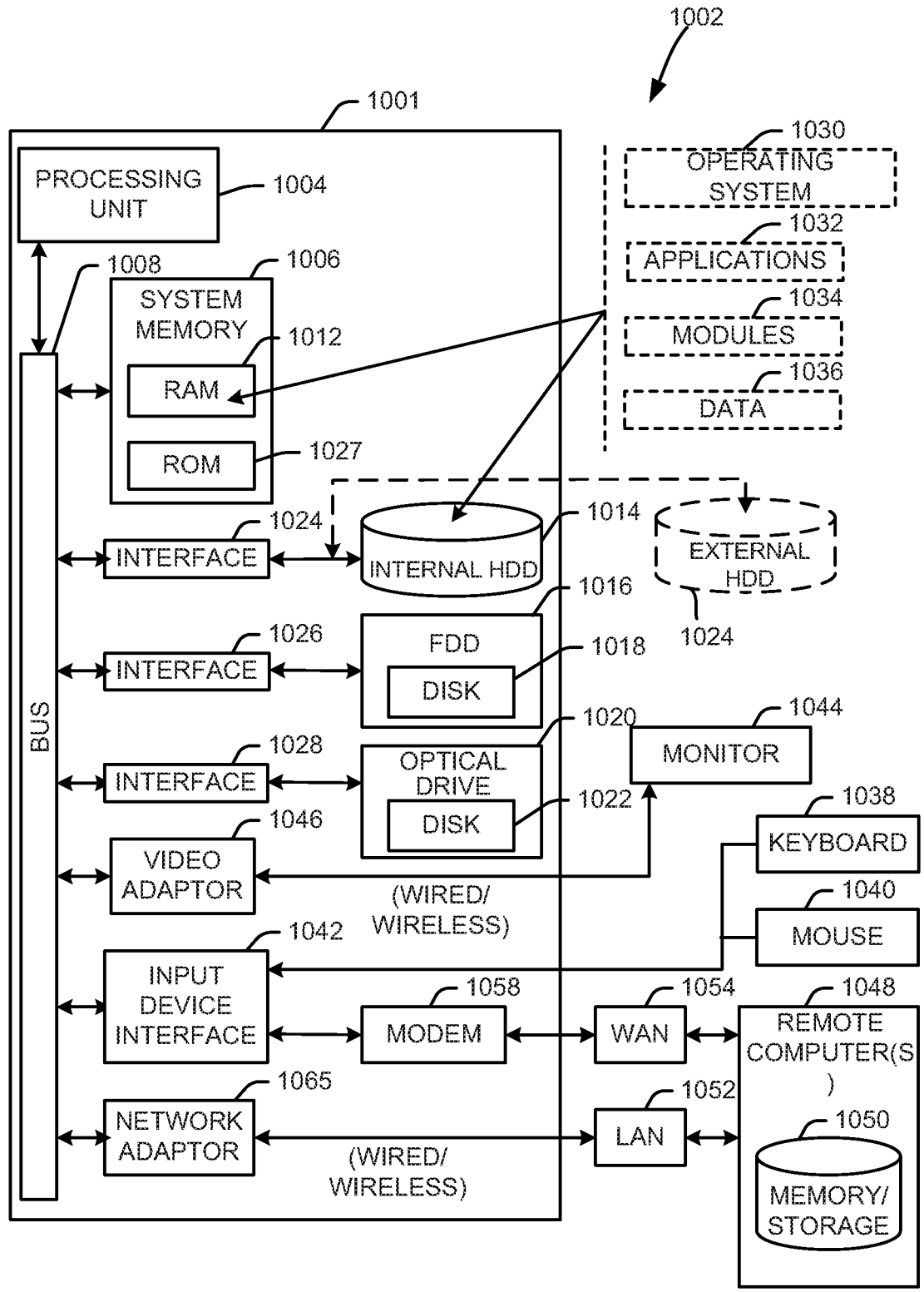
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1094), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, comprising:

associating a first group of control channel resource sets with a first usage scenario based on a first quality of service condition associated with first data traffic, wherein the first group of control channel resource sets facilitates decoding first downlink control information relating to the first usage scenario;

associating a second group of control channel resource sets with a second usage scenario based on a second quality of service condition associated with second data traffic, wherein the first group of control channel resource sets corresponds to a first transmission point, wherein the second group of control channel resource sets corresponds to a second transmission point, and wherein the first group of control channel resource sets is associated with a first demodulation reference signal pattern that is different from a second demodulation reference signal pattern associated with the second group of control channel resource sets; and transmitting the first downlink control information to a user equipment in association with information corresponding to the first group of control channel resource sets.

2. The system of claim 1, wherein the second group of control channel resource sets facilitates decoding second downlink control information relating to the second usage scenario.

3. The system of claim 1, wherein the first data traffic is a first type of data traffic, wherein the second data traffic is a second type of data traffic, wherein the first quality of service condition relates to the first type of data traffic of a group of types of data traffic comprising an enhanced mobile broadband, an ultra-reliable low latency communication, and a massive machine type communication, wherein the second quality of service condition relates to the second type of data traffic of the group of types of data traffic, and wherein the second type of data traffic is different from the first type of data traffic.

4. The system of claim 1, wherein the first data traffic is a first type of data traffic, wherein the second data traffic is a second type of data traffic, wherein the information corresponding to the first group of control channel resource sets is first information corresponding to the first group of control channel resource sets, and wherein the operations further comprise:

analyzing data traffic that is to be communicated;

based on a result of the analyzing, determining that the data traffic is the first data traffic of the first type of data traffic or a source of the first data traffic;

in response to the determining that the data traffic is the first data traffic of the first type of data traffic or the source of the first data traffic, determining that the first data traffic relates to the first usage scenario; and in response to the determining that the first data traffic relates to the first usage scenario, determining that the first information corresponding to the first group of control channel resource sets is to be transmitted to the user equipment as opposed to transmitting second information corresponding to the second group of control channel resource sets to the user equipment.

5. The system of claim 1, wherein the operations further comprise:

analyzing the first quality of service condition associated with the first data traffic; and determining the first group of control channel resource sets that satisfies the first quality of service condition based on a result of the analyzing of the first quality of service condition.

6. The system of claim 1, wherein the operations further comprise:

determining the first quality of service condition, wherein the first quality of service condition is associated with a first latency condition; and determining the second quality of service condition, wherein the second quality of service condition is associated with a second latency condition, and wherein the second latency condition is different from the first latency condition.

7. The system of claim 1, wherein the first group of control channel resource sets is associated with a first aggregation level that is different from a second aggregation level associated with the second group of control channel resource sets.

8. The system of claim 1, wherein the first demodulation reference signal pattern comprises a front-loaded demodulation reference signal pattern that is mapped over a group of adjacent orthogonal-frequency-division-multiplexing symbols in a front portion of a slot and another demodulation reference signal pattern in a remaining portion of the slot.

9. The system of claim 1, wherein the first group of control channel resource sets corresponds to a first search space, and wherein the second group of control channel resource sets corresponds to a second search space.

10. The system of claim 1, wherein the first group of control channel resource sets is enabled to use a first multiple input, multiple output transmission protocol that is different from a second multiple input, multiple output transmission protocol that is enabled for use by the second group of control channel resource sets.

11. A method, comprising:

configuring, by a system comprising a processor, a first group of control channel resource sets based on a first quality of service condition associated with a first type of data traffic, wherein the first group of control channel resource sets facilitates decoding first downlink control information associated with the first type of data traffic;

configuring, by the system, a second group of control channel resource sets based on a second quality of service condition associated with a second type of data traffic, wherein the first group of control channel resource sets corresponds to a first transmission point, wherein the second group of control channel resource sets corresponds to a second transmission point, and wherein the first group of control channel resource sets is associated with a first demodulation reference signal pattern that is distinct from a second demodulation reference signal pattern associated with the second group of control channel resource sets; and transmitting, by the system, the first downlink control information to a device in association with data relating to the first group of control channel resource sets.

12. The method of claim 11, wherein the first quality of service condition relates to the first type of data traffic of a group of types of data traffic comprising an enhanced mobile broadband, an ultra-reliable low latency communication, and a massive machine type communication, wherein the second quality of service condition relates to the second type of data traffic of the group of types of data traffic, and wherein the second type of data traffic is different from the first type of data traffic.

13. The method of claim 11, wherein the data relating to the first group of control channel resource sets is first data relating to the first group of control channel resource sets, wherein the first data traffic is a first type of data traffic, and wherein the second data traffic is a second type of data traffic, and wherein the method further comprises:
- analyzing, by the system, data traffic that is to be communicated;
- determining, by the system, that the data traffic is the first data traffic that is the first type of data traffic based on a result of the analyzing; and
- in response to determining that the data traffic is the first data traffic that is the first type of data traffic, determining, by the system, that the first data relating to the first group of control channel resource sets is to be transmitted to the device as opposed to transmitting second data relating to the second group of control channel resource sets to the device.

14. The method of claim 11, further comprising:
- transmitting, by the system, the data relating to the first group of control channel resource sets to the device with the first downlink control information or in a separate transmission from the transmitting of the first downlink control information to the device, wherein the data comprises the first group of control channel resource sets or a first group identifier that is indicative of the first group of control channel resource sets.

15. The method of claim 11, further comprising:
- determining, by the system, the first quality of service condition, wherein the first quality of service condition relates to a first latency condition, a first reliability metric, or a first data rate associated with a first communication of first data traffic of the first type of data traffic; and
- determining, by the system, the second quality of service condition, wherein the second quality of service condition relates to a second latency condition, a second reliability metric, or a second data rate associated with a second communication of second data traffic of the second type of data traffic, and wherein the second quality of service condition is different from the first quality of service condition.

16. The method of claim 11, wherein the first group of control channel resource sets is associated with a first beam management and recovery procedure that is different from a second beam management and recovery procedure associated with the second group of control channel resource sets.

17. The method of claim 11, wherein the first group of control channel resource sets is associated with a first radio link monitoring and radio link failure procedure that is different from a second radio link monitoring and radio link failure procedure associated with the second group of control channel resource sets.

18. The method of claim 11, wherein the first group of control channel resource sets is associated with a first transmission scheme that is different from a second transmission scheme associated with the second group of control channel resource sets.

19. A non-transitory machine-readable medium, comprising executable instructions that, when executed by a processor, facilitate performance of operations, comprising:
- associating a first group of control channel resource sets with a first usage scenario based on a first quality of service condition determined to be associated with a first type of data traffic, wherein the first group of control channel resource sets enables decoding first downlink control information relating to the first usage scenario;
- associating a second group of control channel resource sets with a second usage scenario based on a second quality of service condition determined to be associated with a second type of data traffic, wherein the first group of control channel resource sets is associated with a first transmission point, wherein the second group of control channel resource sets is associated with a second transmission point, and wherein the first group of control channel resource sets is associated with a first demodulation reference signal pattern that is different from a second demodulation reference signal pattern associated with the second group of control channel resource sets; and
- in response to determining that data traffic to be communicated is the first type of data traffic, communicating the first downlink control information to a device in association with information relating to the first group of control channel resource sets.

20. The non-transitory machine-readable medium of claim 19, wherein the first quality of service condition relates to the first type of data traffic of a group of types of data traffic comprising an enhanced mobile broadband, an ultra-reliable low latency communication, and a massive machine type communication, wherein the second quality of service condition relates to the second type of data traffic of the group of types of data traffic, and wherein the second type of data traffic is different from the first type of data traffic.

* * * * *